US010619545B2

(12) United States Patent
Park et al.

(10) Patent No.: US 10,619,545 B2
(45) Date of Patent: Apr. 14, 2020

(54) SYSTEM OF FORCIBLY REGENERATING GASOLINE PARTICULATE FILTER

(71) Applicants: Hyundai Motor Company, Seoul (KR); Kia Motors Corporation, Seoul (KR)

(72) Inventors: Jong Il Park, Seoul (KR); Seungwoo Hong, Seoul (KR); Heechang Oh, Suwon-si (KR); Yeongseop Park, Seoul (KR); Dong Hee Han, Seoul (KR); Hyungbok Lee, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 7 days.

(21) Appl. No.: 16/202,280

(22) Filed: Nov. 28, 2018

(65) Prior Publication Data

US 2020/0018215 A1  Jan. 16, 2020

(30) Foreign Application Priority Data

Jul. 10, 2018  (KR) .......................... 10-2018-0080151

(51) Int. Cl.
*F01N 9/00* (2006.01)
*F02B 29/04* (2006.01)
(Continued)

(52) U.S. Cl.
CPC ......... *F01N 9/002* (2013.01); *B01D 46/0063* (2013.01); *B01D 46/446* (2013.01);
(Continued)

(58) Field of Classification Search
CPC .............. B01D 46/0063; B01D 46/446; B01D 53/9454; B01D 2279/30; F01N 3/0233; F01N 3/035; F01N 3/101; F01N 9/002; F01N 2260/02; F01N 2900/1406; F02B 29/04; F02B 39/10; F02B 39/16; F02M 35/10157; F02M 35/10229
See application file for complete search history.

(56) References Cited

U.S. PATENT DOCUMENTS 9,187,073 B2 * 11/2015 Kim ........................ F02B 39/10

FOREIGN PATENT DOCUMENTS

KR  10-2018-0068005 A  6/2018

* cited by examiner

*Primary Examiner* — Brandon D Lee
(74) *Attorney, Agent, or Firm* — Morgan, Lewis & Bockius LLP

(57) ABSTRACT

A system of forcibly regenerating a gasoline particulate filter may include an exhaust pipe connected to the engine; a catalyst apparatus mounted on the exhaust pipe; first and second intake lines; first and second electric superchargers disposed on the first and second intake lines; a bypass line connecting a first point of the first supercharger and a second point of the second supercharger to each other; a first intake valve disposed at a downstream of the first point of the first intake line; a second intake valve disposed at an upstream of the second point of the second intake line; a bypass valve disposed on the bypass line; and a regeneration air line connecting the first intake line or the bypass line between the first electric supercharger, the first intake valve, and the bypass valve to the exhaust pipe between the catalyst apparatus and the gasoline particulate filter.

15 Claims, 3 Drawing Sheets

(51) Int. Cl.
    *F02B 39/10*       (2006.01)
    *F02M 35/10*      (2006.01)
    *F02B 39/16*       (2006.01)
    *F01N 3/023*       (2006.01)
    *F01N 3/035*       (2006.01)
    *B01D 46/00*      (2006.01)
    *B01D 46/44*      (2006.01)
    *B01D 53/94*      (2006.01)
    *F01N 3/10*        (2006.01)

(52) U.S. Cl.
CPC ....... *B01D 53/9454* (2013.01); *F01N 3/0233* (2013.01); *F01N 3/035* (2013.01); *F01N 3/101* (2013.01); *F02B 29/04* (2013.01); *F02B 39/10* (2013.01); *F02B 39/16* (2013.01); *F02M 35/10157* (2013.01); *F02M 35/10229* (2013.01); *B01D 2279/30* (2013.01); *F01N 2260/02* (2013.01); *F01N 2900/1406* (2013.01)

SYSTEM OF FORCIBLY REGENERATING GASOLINE PARTICULATE FILTER

CROSS-REFERENCE TO RELATED APPLICATION

The present application claims priority to Korean Patent Application No. 10-2018-0080151 filed on Jul. 10, 2018, the entire contents of which is incorporated herein for all purposes by this reference.

BACKGROUND OF THE INVENTION

Field of the Invention

The present invention relates to a system of regenerating a gasoline particulate filter (GPF), and more particularly, to a system and method of regenerating a gasoline particulate filter using an electric supercharger.

Description of Related Art

A conventional diesel engine, which draws and presses only the air through a cylinder and then injects diesel fuel to ignite, has the problem of emission of particulate matter (PM), but as a gasoline direct injection type engine that directly injects fuel into the cylinder is recently applied to a gasoline engine according to a trend of high output and high efficiency of the engine, an occurrence of the particulate matter (PM) becomes problematic due to an increase of an incomplete combustion zone in a combustion chamber. To solve the occurrence of the PM, research and development such as application of a gasoline particulate filter provided as a soot filter used in the diesel engine are actively conducted. The soot collected in the gasoline particulate filter is removed only when it is combined with oxygen and burned at a certain temperature or higher, which is called "regeneration" of the gasoline particulate filter. According to most conventional gasoline particulate filter systems, the gasoline particulate filter is disposed downstream of a three-way catalyst, or the three-way catalyst and the gasoline particulate filter have the same body. Conventionally, to remove the soot, a method of accelerating a combustion of the soot by perceiving an ignition time to increase a temperature of an exhaust gas, or increasing a concentration of oxygen by setting a target control air-fuel ratio to a value higher than 1, which is a theoretical air-fuel ratio, has been used. However, in the instant case, because of a rarefied mixed gas composition, the combustion chamber of the engine may not be combusted at the theoretical air-fuel ratio, and a high temperature gas having the rarefied air-fuel ratio is also introduced into the three-way catalyst located at the front end portion of the gasoline particulate filter. When the high temperature exhaust gas having the rarefied air-fuel ratio passes through the three-way catalyst, purification efficiency of the three-way catalyst itself is lowered and the temperature of the exhaust gas is unnecessarily raised in the catalyst, which may adversely affect durability of the catalyst itself.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system of forcibly regenerating a gasoline particulate filter having advantages of regenerating the gasoline particulate filter by mounting electric superchargers on two intake lines, respectively, supplying air to a combustion chamber of an engine and mounting a regeneration air line directly connected to front end portion of the gasoline particulate filter without passing through the combustion chamber from one of the two intake lines to thereby supply the air to the gasoline particulate filter through the regeneration air line when the regeneration of the gasoline particulate filter is required.

Various aspects of the present invention are directed to providing a system of forcibly regenerating a gasoline particulate filter including: an engine including at least one combustion chamber that generates a driving force by a combustion of fuel; an exhaust pipe connected to the engine and through which exhaust gas flows; a catalyst apparatus mounted on the exhaust pipe and purifying the exhaust gas; the gasoline particulate filter mounted on a rear end portion of the catalyst apparatus of the exhaust pipe and collecting a particulate matter contained in the exhaust gas; a first intake line and a second intake line that supply air to the combustion chamber; a first electric supercharger and a second electric supercharger disposed on the first intake line and the second intake line, respectively; a bypass line connecting a first point of a downstream of the first supercharger of the first intake line and a second point of an upstream of the second supercharger of the second intake line to each other; a first intake valve disposed at a downstream of the first point of the first intake line; a second intake valve disposed at an upstream of the second point of the second intake line; a bypass valve disposed on the bypass line; and a regeneration air line connecting the first intake line or the bypass line between the first electric supercharger, the first intake valve, and the bypass valve to the exhaust pipe between the catalyst apparatus and the gasoline particulate filter to supply air drawn in by the first electric supercharger to the gasoline particulate filter.

The system may further include a controller configured for controlling the first and second electric superchargers, the first and second intake valves, and the bypass valve.

The system may further include a control valve disposed on the bypass line to control a flow direction or a flow rate of the air flowing through the regeneration air line, wherein the controller may further control the control valve.

The system may further include a differential pressure sensor measuring a differential pressure between a front end portion and a rear end portion of the gasoline particulate filter, wherein when the differential pressure measured by the differential pressure sensor is a predetermined value or more, the controller may be configured to determine that a forcible regeneration condition of the gasoline particulate filter is satisfied.

When the controller is configured to determine that the forcible regeneration condition is satisfied, the controller may close the first intake valve, close the bypass valve, and drive the first electric supercharger to forcibly send the air flowing through the first intake line to the gasoline particulate filter through the regeneration air line.

The first intake line and the second intake line may join at a main intake line, and a main intercooler may be mounted on the main intake line.

The system may further include an auxiliary intercooler disposed on the bypass line.

The bypass valve may be located at an upstream of the auxiliary intercooler.

The system may further include a throttle valve controlling a flow rate supplied to the combustion chamber through the first intake line or the second intake line.

The catalyst apparatus may be a three-way catalyst apparatus.

According to an exemplary embodiment of the present invention, when the gasoline particulate filter is forcibly regenerated, the air is directly supplied to the gasoline particulate filter, making it possible to avoid a decrease in catalyst purification efficiency and an unnecessary increase in catalyst temperature.

Furthermore, the decrease in the catalyst purification efficiency is prevented, making it possible to reduce an amount of exhaust gas, and the increase in the catalyst temperature is prevented, making it possible to contribute to increase durability of the catalyst.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
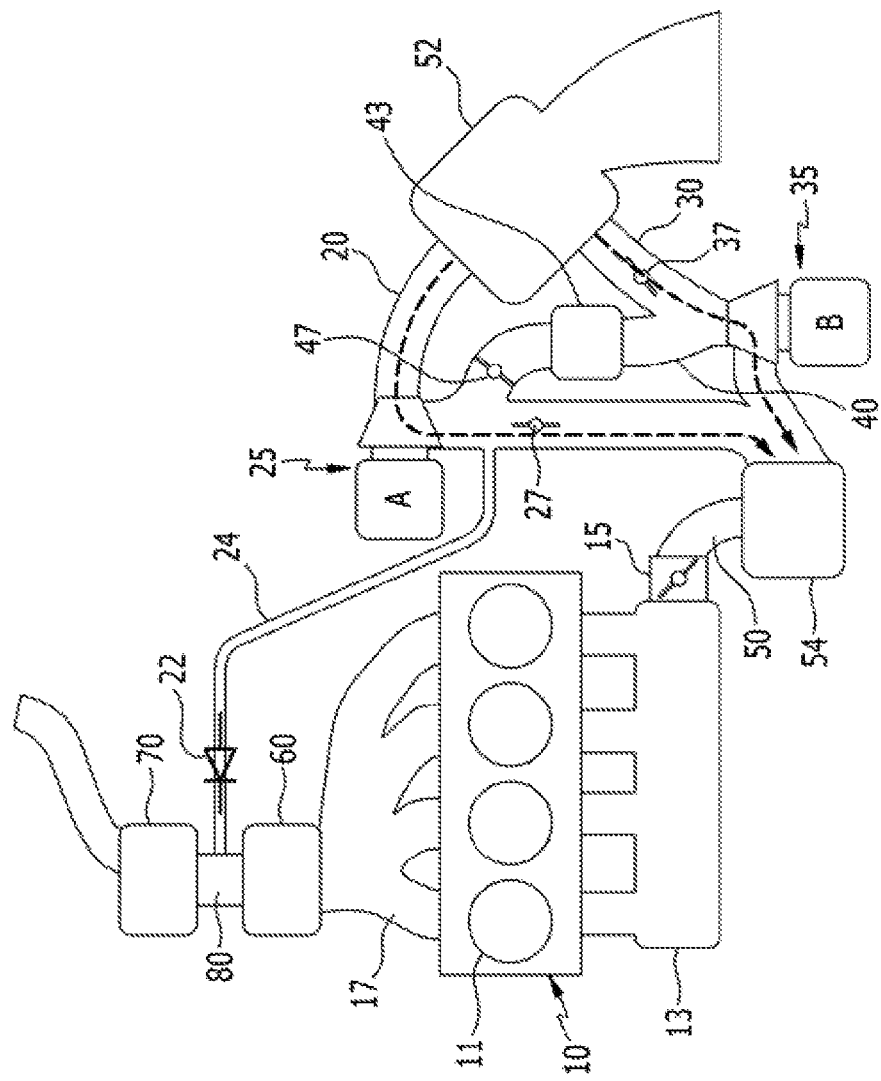
FIG. 1 is a conceptual view exemplarily illustrating a configuration of a system of forcibly regenerating a gasoline particulate filter according to an exemplary embodiment of the present invention and is a view exemplarily illustrating an air flow of a case in which the gasoline particulate filter is not forcibly regenerated.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

A description for contents that are not associated with the present invention will be omitted to clearly describe the present invention, and like reference numerals designate like elements throughout the specification.

Furthermore, since sizes and thicknesses of the respective components were arbitrarily shown in the accompanying drawings for convenience of explanation, the present invention is not limited to contents shown in the accompanying drawings. Furthermore, thicknesses were exaggerated to obviously represent several portions and regions.

Hereinafter, an engine system according to an exemplary embodiment of the present invention will be described in detail with reference to the accompanying drawings.

Figure 3:
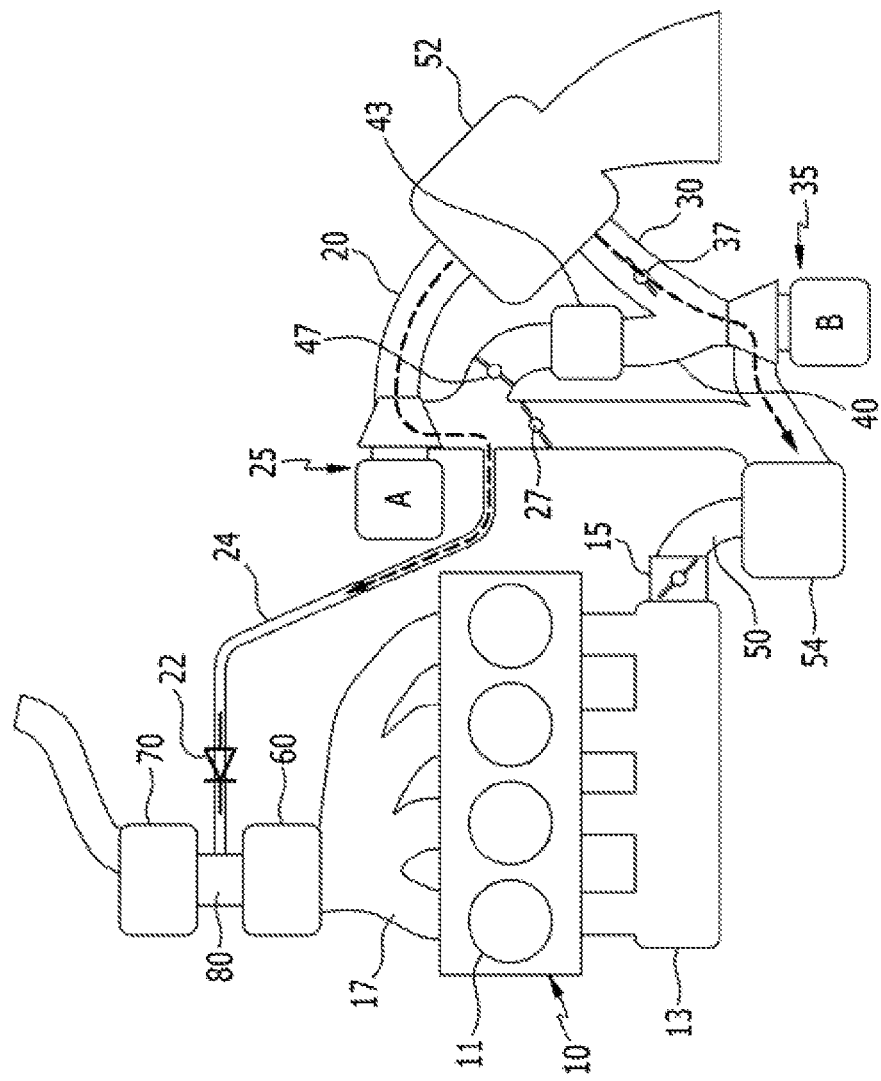
FIG. 3 is a conceptual view exemplarily illustrating a configuration of a system of forcibly regenerating a gasoline particulate filter according to an exemplary embodiment of the present invention and is a view exemplarily illustrating an air flow of a case in which the gasoline particulate filter is forcibly regenerated.

FIG. 1 is a conceptual view exemplarily illustrating a configuration of a system of forcibly regenerating a gasoline particulate filter according to an exemplary embodiment of the present invention and is a view exemplarily illustrating an air flow of a case in which the gasoline particulate filter is not forcibly regenerated and FIG. 3 is a conceptual view exemplarily illustrating a configuration of a system of forcibly regenerating a gasoline particulate filter according to an exemplary embodiment of the present invention and is a view exemplarily illustrating an air flow of a case in which the gasoline particulate filter is forcibly regenerated.

As illustrated in FIGS. 1 and 3, the system of forcibly regenerating a gasoline particulate filter according to an exemplary embodiment of the present invention includes an engine 10 including a combustion chamber 11 that generates a driving force by a combustion of fuel, first and second intake lines 20 and 30 connected to the combustion chamber 11 to supply air to the combustion chamber 11, and first and second electric superchargers 25 and 35 disposed on the first and second intake lines 20 and 30, respectively. Furthermore, the system of forcibly regenerating a gasoline particulate filter further includes an exhaust pipe 80 for discharging an exhaust gas generated in the combustion chamber 11 to the outside of a vehicle, a catalyst apparatus 60 mounted on the exhaust pipe 80 to remove harmful matters contained in the exhaust gas, and a gasoline particulate filter 70 mounted on the exhaust pipe 80 of a downstream of the catalyst apparatus 60 to collect and remove particulate matters contained in the exhaust gas.

The engine 10 may further include an intake manifold 13 which is selectively connectable to the combustion chamber 11 to supply air thereto, and an exhaust manifold 17 selectively connecting the combustion chamber 11 and the exhaust pipe 80 to each other to discharge the exhaust gas generated in the combustion chamber 11 to the outside of the vehicle. The engine 10 may be a gasoline engine (i.e., an ignition switch is disposed in the combustion chamber). Furthermore, the engine 10 may be a gasoline direct injection (GDI) engine that directly injects fuel to the combustion chamber 11. The kind of the engine 10 is not necessarily limited to the gasoline engine, particularly, the GDI engine. Furthermore, although the drawings illustrate that the engine 10 includes four combustion chambers 11, the number of combustion chambers 11 is not necessarily limited to four.

The catalyst apparatus 60 may be a three-way catalyst apparatus. The three-way catalyst apparatus reduces CO, HC and NOx in the gasoline exhaust gas. In the three-way catalyst apparatus, CO and HC are converted into a harmless component by oxidation reaction, and at the same time, NOx is converted into the harmless component by a reduction reaction. Noble metal components of platinum (Pt)/palladium (Pd)/rhodium (Rh) including palladium (Pd) are used in the three-way catalyst apparatus, and Pd accelerates the oxidation reaction that mainly reduces CO and HC, and Rh accelerates the reduction reaction of NOx. The gasoline particulate filter 70 refers to an apparatus collecting a particulate matter (PM) contained in the exhaust gas of the gasoline engine. The particulate matter refers to all the emission components excluding a condensation component among vehicle emission components that are diluted with air at a certain temperature or less and collected in a filter. A soot, which is one kind of particulate matter, is generated by incomplete combustion of fuel in the combustion chamber 11 of the engine 10. In a case in which the soot accumulates in the gasoline particulate filter 70, a performance of the gasoline particulate filter 70 may deteriorate. To prevent the performance degradation, the soot in the gasoline particulate filter 70 is removed by combusting the soot, which is referred to as 'regeneration' of the gasoline particulate filter 70. The regeneration may be largely classified into natural regeneration and forcible regeneration. The natural regeneration means that the soot accumulated in the gasoline particulate filter 70 is naturally regenerated without artificial manipulation by the controller, and the forcible regeneration means regeneration caused by forcibly raising the temperature of the exhaust gas under the control of the controller and forcibly supplying oxygen to the gasoline particulate filter 70.

The air introduced into the vehicle from the outside thereof is filtered by an air cleaner 52, is supplied to a main intake line 50 through the first and second intake lines 20 and 30, and is then supplied to the combustion chamber 11 through a throttle valve 15. A main intercooler 54 may be disposed on the main intake line 50. The main intercooler 54 may cool the air flowing through the main intake line 50.

A first electric supercharger 25 is disposed on the first intake line 20, and a second electric supercharger 35 is disposed on the second intake line 30. The first and second electric superchargers 25 and 35 are to supply supercharged air to the combustion chamber 11 and include a motor and an electric compressor. The electric compressor is operated by the motor to compress the air according to operation conditions and supply the compressed air to the combustion chamber 11.

A bypass line 40 connecting the first intake line 20 and the second intake line 30 to each other is disposed between the first intake line 20 and the second intake line 30. That is, the bypass line 40 branches at a first point of the first intake line 20 and joins at a second point of the second intake line 30. The first point is located at the downstream of the first electric supercharger 25 on the first intake line 20, and the second point is located at the upstream of the second electric supercharger 35 on the second intake line 30. Therefore, the air drawn in by the first electric supercharger 25 may flow from the first intake line 20 to the second intake line 30 through the bypass line 40 and then flow into the main intake line 50 by the second electric supercharger 35, if necessary.

A first intake valve 27 is disposed on the first intake line 20. The first intake valve 27 may be disposed at the downstream of the first point on the first intake line 20. A flow rate passing through the first intake line 20 may be adjusted by an amount of opening of the first intake valve 27.

A second intake valve 37 is disposed on the second intake line 30. The second intake valve 37 may be disposed at the upstream of the second point on the second intake line 30. A flow rate passing through the second intake line 30 may be adjusted by an amount of opening of the second intake valve 37.

A bypass valve 47 is disposed on the bypass line 40. The bypass valve 47 may adjust a flow rate flowing through the bypass line 40. An auxiliary intercooler 43 may be disposed on the bypass line 40. The air flowing through the bypass line 43 is cooled by the auxiliary intercooler 43. The bypass valve 47 may be mounted at an upstream of the auxiliary intercooler 43, but is not limited thereto.

The air introduced through the first intake line 20 or the second intake line 30 joins at the main intake line 50. The air is cooled by the main intercooler 54 disposed on the main intake line 50 and is then sent to the intake manifold 13 by pressure. The throttle valve 15 is mounted on the intake manifold 13 such that a flow rate supplied to the combustion chamber 11 is adjusted.

The system of forcibly regenerating a gasoline particulate filter according to an exemplary embodiment of the present invention further includes a regeneration air line 24 for forcibly supplying the air of the first intake line 20 to the gasoline particulate filter 70. The regeneration air line 24 connects the first intake line 20 or the bypass line 40 between the first electric supercharger 25, the first intake valve 27, and the bypass valve 47 to the exhaust pipe 80 between the catalyst apparatus 60 and the gasoline particulate filter 70. Accordingly, the air drawn in by the first electric supercharger 25 may be supplied to the exhaust pipe 80 located at the upstream of the gasoline particulate filter 70 through the regeneration air line 24. Therefore, oxygen for combusting the soot collected in the gasoline particulate filter 70 may be directly supplied to the gasoline particulate filter 70. A control valve 22 may be disposed on the regeneration air line 24. The control valve 22 allows the air flowing through the regeneration air line 24 to flow toward the gasoline particulate filter 70, and prevents the exhaust of the exhaust pipe 80 from flowing back to the first intake line 20. The control valve 22 may be a check valve, but is not limited thereto.

Figure 2:
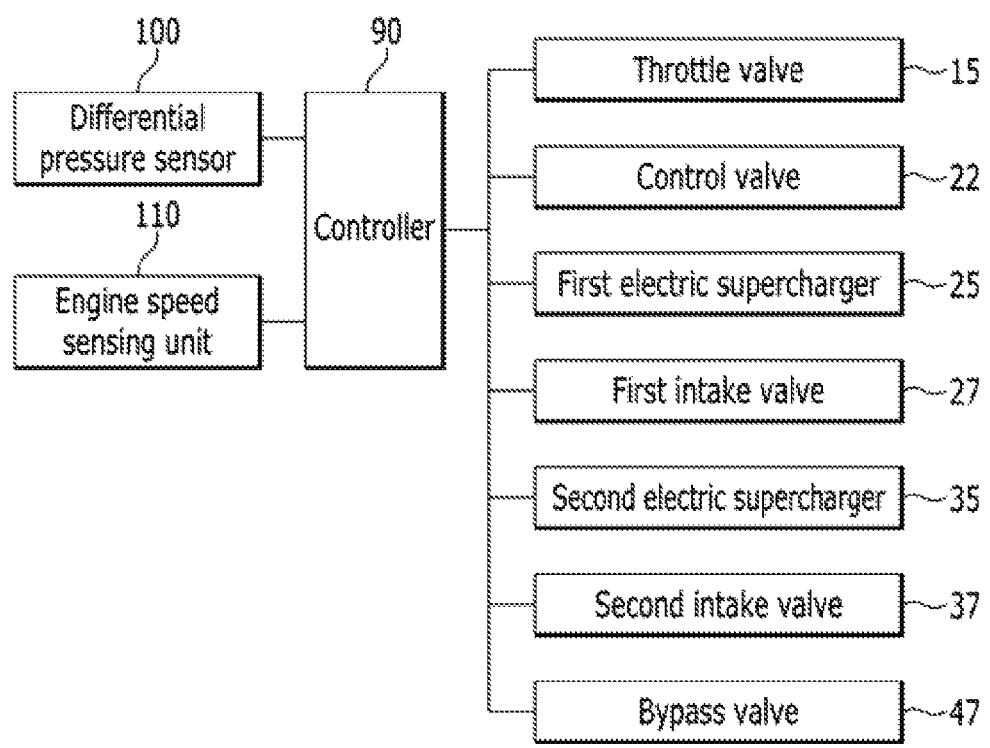
FIG. 2 is a block diagram illustrating the configuration of the system of forcibly regenerating a gasoline particulate filter according to an exemplary embodiment of the present invention.

The system of forcibly regenerating the gasoline particulate filter 70 according to an exemplary embodiment of the present invention may further include a differential pressure sensor 100 measuring a differential pressure, which is a difference between an inlet pressure of the gasoline particulate filter 70 and an outlet pressure thereof, and a controller 90 determining whether or not a forcible regeneration condition of the gasoline particulate filter 70 is satisfied based on the differential pressure measured by the differential pressure sensor 100 (see FIG. 2). Here, the forcible regeneration condition may be satisfied in a case in which the differential pressure between a front end portion and a rear end portion of the gasoline particulate filter 70 measured by the differential pressure sensor 100 is a predetermined value or more. That is, in the case in which the soot accumulates in the gasoline particulate filter 70, the differential pressure between the front end portion and the rear end portion of the gasoline particulate filter 70 is increased. In the case in which the differential pressure between the front end portion and the rear end portion of the gasoline particulate filter 70 is the predetermined value or more, since a performance of the gasoline particulate filter 70 deteriorates, it is necessary to remove the soot in the gasoline particulate filter 70. The predetermined value is an arbitrary value selected by those skilled in the art.

FIG. 2 is a block diagram illustrating the configuration of the system of forcibly regenerating a gasoline particulate filter according to an exemplary embodiment of the present invention.

As illustrated in FIG. 2, the system of forcibly regenerating the gasoline particulate filter according to an exemplary embodiment of the present invention is controlled by the controller 90.

The controller 90 is connected to the differential pressure sensor 100 to receive the differential pressure between the front end portion and the rear end portion of the gasoline particulate filter 70 measured by the differential pressure sensor 100. Furthermore, the controller 90 determines whether or not the forcible regeneration condition is satisfied based on the differential pressure. Furthermore, the controller 90 controls the first and second electric superchargers 25 and 35, the first and second intake valves 27 and 37, the bypass valve 47, and the control valve 22 based on whether or not the forcible regeneration condition is satisfied. The forcible regeneration condition refers to a case in which the differential pressure measured by the differential pressure sensor 100 is measured to be the predetermined value or more, that is, a case in which the performance of the gasoline particulate filter 70 is maintained when the soot accumulated in the gasoline particulate filter 70 is removed.

Furthermore, the system of forcibly regenerating the gasoline particulate filter according to an exemplary embodiment of the present invention may further include an engine speed detecting unit 110 detecting a rotation speed of the engine 10 and transferring the detected speed of the engine 10 to the controller 90.

When the forcible regeneration condition is not satisfied, the controller 90 controls the first and second intake valves 27 and 37 and the bypass valve 47 according to a rotation speed of the engine 10 received from the engine speed detecting unit 110. Furthermore, the controller 90 controls the throttle valve 15 to control the flow rate supplied to the combustion chamber 11.

Hereinafter, an operation of the system of forcibly regenerating the gasoline particulate filter according to an exemplary embodiment of the present invention will be described in detail around an air flow with reference to FIGS. 1 and 3.

An air flow of a case in which the controller 90 determines that the forcible regeneration condition of the gasoline particulate filter 70 is not satisfied because the differential pressure measured by the differential pressure sensor 100 is measured to be less than the predetermined value will be described with reference to FIG. 1.

When the controller 90 determines that the engine 10 rotates at a high speed through the rotation speed of the engine 10 detected by the engine speed detecting unit 110, the controller 90 may perform a control so that the first and second intake valves 27 and 37 are opened and the bypass valve 47 is closed, as illustrated in FIG. 1.

Therefore, the air drawn in by the first electric supercharger 25 and the air drawn in by the second electric supercharger 35 may join at the main intake line 50 through the first intake line 20 and the second intake line 30, respectively, if necessary, and may be supplied to the combustion chamber 11 through the intake manifold 13.

In the instant case, the flow rate supplied to the combustion chamber 11 may be adjusted by the controller 90 controlling the amount of opening of the throttle valve 15.

Although not illustrated in FIG. 1, when the controller 90 determines that the engine 10 rotates at a low speed or a middle speed through the rotation speed of the engine 10 detected by the engine speed detecting unit 110, the controller 90 may perform a control so that the first and second intake valves 27 and 37 are closed and the bypass valve 47 is opened.

The air drawn in by the first electric supercharger 25 may flow from the first intake line 20 to the second intake line 30 through the bypass line 40 and be then supplied to the combustion chamber 11 via the intake manifold 13 through the main intake line 50 by the second electric supercharger 35, if necessary.

In the instant case, the flow rate may be adjusted by the controller 90 controlling the amount of opening of the throttle valve 15.

Furthermore, a reference for determining whether the rotation speed of the engine 10 is low speed, low and middle speed, or high speed may be arbitrarily set by those skilled in the art.

An air flow of a case in which the controller 90 determines that the forcible regeneration condition of the gasoline particulate filter 70 is satisfied because the differential pressure measured by the differential pressure sensor 100 is measured to be the predetermined value or more will be described with reference to FIG. 3.

As illustrated in FIG. 3, when the controller 90 determines that the forcible regeneration condition of the gasoline particulate filter 70 is satisfied, the controller 90 performs a control so that the first intake valve 27 and the bypass valve 47 are closed and the second intake valve 37 is opened.

When the first intake valve 27 and the bypass valve 47 are closed, the controller 90 drives the first electric supercharger 25 to draw the air, and the air is supplied to a predetermined space surrounded by the first intake valve 27, the bypass valve 47, and the first electric supercharger 25.

The air is supplied to the gasoline particulate filter 70 through the regeneration air line 24 located on the first intake line 20 or the bypass line 40.

In the instant case, the controller 90 opens the control valve 22 only in a case in which a pressure of the air in the predetermined space is higher than a pressure of the exhaust of the gasoline particulate filter 70, making it possible to prevent the exhaust from flowing back to the predetermined space from the gasoline particulate filter 70.

Furthermore, the controller 90 may control an amount of opening of the control valve 22 to control the flow rate supplied to the gasoline particulate filter 70.

The control valve 22 may be a check valve. In the instant case, the air is supplied to the gasoline particulate filter 70 only in the case in which the pressure of the air in the predetermined space is higher than the pressure of the exhaust of the gasoline particulate filter 70, and it is possible to prevent the exhaust from flowing back to the predetermined space from the gasoline particulate filter 70.

In the instant case, the air supplied from the outside thereof is supplied to the combustion chamber 11 through the second intake line 30. The controller 90 controls the amount of opening of the throttle valve 15 to the flow rate of air supplied to the combustion chamber 11.

The method accelerates the combustion of the soot by the air supplied to the gasoline particulate filter 70, making it possible to forcibly regenerate the gasoline particulate filter 70.

Furthermore, the throttle vale 15 is controlled so that an air-fuel ratio in the combustion chamber 11 becomes a theoretical air-fuel ratio, making it possible to improve a performance of the catalyst apparatus.

The system is applicable to all general vehicles, mild hybrid vehicles, and hybrid vehicles.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system of forcibly regenerating a gasoline particulate filter, the system comprising:
   an engine including at least one combustion chamber that generates a driving force by a combustion of fuel;
   an exhaust pipe connected to the at least one combustion chamber and through which exhaust gas flows;
   a catalyst apparatus mounted on the exhaust pipe and purifying the exhaust gas;
   the gasoline particulate filter mounted on the exhaust pipe at downstream of the catalyst apparatus and collecting a particulate matter contained in the exhaust gas;
   a first intake line and a second intake line which are connected to the at least one combustion chamber and supply air to the at least one combustion chamber;
   a first electric supercharger and a second electric supercharger mounted on the first intake line and the second intake line, respectively;
   a bypass line connecting a first point of a downstream of the first supercharger on the first intake line and a second point of an upstream of the second supercharger on the second intake line to each other;
   a first intake valve mounted at a downstream of the first point of the first intake line;
   a second intake valve mounted at an upstream of the second point of the second intake line;
   a bypass valve mounted on the bypass line; and
   a regeneration air line connecting the first intake line or the bypass line between the first electric supercharger, the first intake valve, and the bypass valve to the exhaust pipe between the catalyst apparatus and the gasoline particulate filter to supply air drawn in by the first electric supercharger to the gasoline particulate filter.

2. The system of claim 1, further including:
   a controller configured for controlling the first and second electric superchargers, the first and second intake valves, and the bypass valve.

3. The system of claim 2, further including:
   a control valve mounted on the bypass line to control a flow direction or a flow rate of the air flowing through the regeneration air line,
   wherein the controller further controls the control valve.

4. The system of claim 2, further including:
   a control valve mounted on the bypass line to control a flow direction or a flow rate of the air flowing through the regeneration air line,
   wherein the control valve includes a check valve.

5. The system of claim 1, further including:
   a differential pressure sensor measuring a differential pressure between a upstream and a downstream of the gasoline particulate filter.

6. The system of claim 5, wherein, when the differential pressure determined by the differential pressure sensor is a predetermined value or more, the controller is configured to determine a forcible regeneration condition of the gasoline particulate filter to be satisfied.

7. The system of claim 6, wherein, when the controller determines that the forcible regeneration condition is satisfied, the controller is configured to close the first intake valve, to close the bypass valve, to open the second intake valve, and to drive the first electric supercharger to send the air flowing through the first intake line to the gasoline particulate filter through the regeneration air line.

8. The system of claim 6, wherein, when the controller identifies that the differential pressure determined by the differential pressure sensor is less than the predetermined value and that the engine rotates at a speed higher than a predetermined speed value, the controller controls the first and second intake valves to be opened and the bypass valve to be closed.

9. The system of claim 6, wherein, when the controller identifies that the differential pressure determined by the differential pressure sensor is less than the predetermined value and that the engine rotates at a speed lower than the predetermined speed value, the controller controls the first and second intake valves to be closed and the bypass valve to be opened.

10. The system of claim 1, wherein the first intake line and the second intake line join at a main intake line connected to the at least one combustion chamber, and a main intercooler is mounted on the main intake line.

11. The system of claim 1, further including an auxiliary intercooler mounted on the bypass line.

12. The system of claim 11, wherein the bypass valve is located at an upstream of the auxiliary intercooler.

13. The system of claim 10, further including a throttle valve mounted on the main intake line and controlling a flow rate supplied to the at least one combustion chamber through the first intake line or the second intake line.

14. The system of claim 1, further including a throttle valve controlling a flow rate supplied to the at least one combustion chamber through the first intake line or the second intake line.

15. The system of claim 1, wherein the catalyst apparatus is a three-way catalyst apparatus.

* * * * *